(12) United States Patent
Lee et al.

(10) Patent No.: US 7,973,777 B2
(45) Date of Patent: Jul. 5, 2011

(54) DISPLAY DEVICE AND DRIVING APPARATUS INCLUDING A PHOTO SENSING CIRCUIT AND A PRESSURE SENSING CIRCUIT AND METHOD THEREOF

(75) Inventors: Joo-Hyung Lee, Gyeonggi-do (KR); Kee-Han Uh, Gyeonggi-do (KR); Young-Jun Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 998 days.

(21) Appl. No.: 11/315,088

(22) Filed: Dec. 21, 2005

(65) Prior Publication Data
US 2006/0138983 A1 Jun. 29, 2006

(30) Foreign Application Priority Data

Dec. 23, 2004 (KR) .................. 10-2004-0111073

(51) Int. Cl.
G06F 3/042 (2011.01)
(52) U.S. Cl. ............................................. 345/175
(58) Field of Classification Search .............. 345/204, 345/173–178; 713/324
See application file for complete search history.

(56) References Cited

U.S. PATENT DOCUMENTS

| | | | |
|---|---|---|---|
| 5,159,323 A | | 10/1992 | Mase et al. |
| 5,184,018 A | * | 2/1993 | Conrads et al. .......... 250/370.09 |
| 5,418,551 A | | 5/1995 | Ise |
| 5,479,208 A | * | 12/1995 | Okumura ...................... 348/301 |
| 6,195,753 B1 | * | 2/2001 | Nakamura ..................... 713/322 |
| 6,317,840 B1 | * | 11/2001 | Dean et al. .................... 713/320 |
| 6,426,736 B1 | | 7/2002 | Ishihara |
| 6,445,383 B1 | * | 9/2002 | Chambers et al. ............ 345/173 |
| 6,504,530 B1 | * | 1/2003 | Wilson et al. ................. 345/173 |
| 6,611,921 B2 | * | 8/2003 | Casebolt et al. .............. 713/324 |
| 2002/0175887 A1 | * | 11/2002 | Yamazaki ........................ 345/87 |
| 2006/0119590 A1 | * | 6/2006 | Park et al. ..................... 345/175 |

FOREIGN PATENT DOCUMENTS

| | | |
|---|---|---|
| CN | 1179554 | 4/1998 |
| JP | 05-073201 | 3/1993 |
| JP | 06-067793 | 11/1994 |
| JP | 07-302168 | 11/1995 |
| JP | 08-249121 | 9/1996 |
| JP | 10-039987 | 2/1998 |
| JP | 2000-075966 | 3/2000 |
| JP | 2001-306255 | 11/2001 |
| JP | 2002-006686 | 1/2002 |
| JP | 2003-167677 | 6/2003 |
| KR | 1997-0008515 | 5/1997 |
| KR | 10-0347440 | 7/2002 |
| KR | 2003-0055857 | 7/2003 |

* cited by examiner

*Primary Examiner* — Chanh Nguyen
*Assistant Examiner* — Jonathan Blancha
(74) *Attorney, Agent, or Firm* — Innovation Counsel LLP

(57) ABSTRACT

A display apparatus may include touch detection circuitry including a light sensing circuit and a physical parameter sensing circuit (e.g., a pressure sensing circuit). The display apparatus may further include processing circuitry implementing a power-saving mode and a normal mode, and configured to generate touch information. An display driver may include a photo sensing circuit and a pressure sensing circuit. An embodiment of the display driver may include: an amplifying unit amplifying a photo sensing signal and a pressure sensing signal; a parallel-to-serial converting unit converting the amplified photo sensing signal and the amplified pressure sensing signal into serial sensing signals; and an analog-to-digital converter converting the serial sensing signals into digital sensing signals, wherein the amplifying unit, the parallel-to-serial converting unit, and the analog-to-digital converter operate in one of a normal mode and a power saving mode according to the pressure sensing signal.

39 Claims, 7 Drawing Sheets

DISPLAY DEVICE AND DRIVING APPARATUS INCLUDING A PHOTO SENSING CIRCUIT AND A PRESSURE SENSING CIRCUIT AND METHOD THEREOF

CROSS-REFERENCE TO RELATED APPLICATIONS

This application claims priority to Korean Patent Application No. 10-2004-0111073 filed in the Korean Patent Office on Dec. 23, 2004, which is hereby incorporated by reference in its entirety.

BACKGROUND OF THE INVENTION (a) Field of the Invention

The present invention relates to a display device and a driving apparatus thereof.

(b) Description of Related Art

A liquid crystal display (LCD) includes a pair of panels provided with pixel electrodes and a common electrode, with a liquid crystal layer having dielectric anisotropy interposed between the panels. The pixel electrodes are arranged in a matrix and connected to switching elements such as thin film transistors (TFTs) such that they receive image data voltages row by row. The common electrode covers a surface of one of the two panels and is supplied with a common voltage. A liquid crystal capacitor is formed by the pixel electrode and corresponding portions of the common electrode, as well as the corresponding portions of the liquid crystal layer. The liquid crystal capacitor and a switching element connected thereto are the basic pixel elements for the device.

An LCD generates electric fields by applying a potential difference between the pixel electrodes and the common electrode. The strength of the electric field in regions of the liquid crystal material alter the transmittance of light passing through the regions of the liquid crystal layer. By applying appropriate potential differences across each of the pixel regions, images are displayed.

Recently, LCD designs incorporating sensors have been developed. The sensors sense a change of pressure or incident light caused by a touch of a finger or a stylus. The sensors provide electrical signals corresponding to a sensed touch to the LCD. The LCD determines whether and where a touch exists based on the electrical signals. The LCD sends information indicative of a sensed touch to an external device, which may generate and return image signals to the LCD based on the received information. Although the sensors may be provided on an external device such as a touch screen panel to be attached to the LCD, doing so may increase the thickness and the weight of the LCD, and may make it difficult to represent minute characters or pictures.

A sensor incorporated into an LCD may be implemented as a thin film transistor (TFT) disposed in a pixel displaying an image.

Additionally, available sensor configurations may not be optimal for some types of devices. LCDs including a sensor array require a sensing signal processor that is continuously reading signals from the sensors when the LCD is powered, thereby continuously consuming power. Accordingly, the power consumption of the LCD may be increased by employing the sensors and the sensing signal processor. This may be problematic for portable devices incorporating LCDs (such mobile phones and personal digital assistant (PDA) devices) which require low power consumption.

SUMMARY OF THE INVENTION

Systems and techniques provided herein may provide for reliable and accurate touch sensing in display devices. A power saving mode may be provided so that touch sensing may be performed with reduced power consumption.

In general, in one aspect, a display apparatus may include touch detection circuitry. The touch detection circuitry may comprise a light sensing circuit configured to generate a signal indicative of sensed light and a physical parameter sensing circuit configured to generate a signal indicative of a sensed physical parameter (such as pressure).

The display may further include processing circuitry configured to generate touch information indicative of at least one of detection information and position information of a touch, wherein the processing circuitry implements a power-saving mode and a normal mode. The processing circuitry may be configured to generate the touch information based on the signal indicative of the sensed physical parameter and not based on the signal indicative of sensed light in the power saving mode. The processing circuitry may be configured to generate the touch information based on the signal indicative of the sensed physical parameter and based on the signal indicative of sensed light in the normal mode.

In general, in another aspect, an apparatus configured to drive a display device may include a photo sensing circuit and a pressure sensing circuit. The apparatus may include an amplifying unit amplifying a photo sensing signal from the photo sensing circuit and a pressure sensing signal from the pressure sensing circuit; a parallel-to-serial converting unit converting the amplified photo sensing signal and the amplified pressure sensing signal into serial sensing signals; and an analog-to-digital converter converting the serial sensing signals into digital sensing signals, wherein the amplifying unit, the parallel-to-serial converting unit, and the analog-to-digital converter operate in one of a normal mode and a power saving mode based on to the pressure sensing signal.

The amplifying unit may include: a first amplifier amplifying the photo sensing signal which does not receive power from a power supply in the power saving mode; and a second amplifier amplifying the pressure sensing signal.

The apparatus may further include: a first sample and holder connected between the first amplifier and the parallel-to-serial converting unit and sample-and-holding the amplified photo sensing signal, where the first sample and holder does not receive power from a power supply in the power saving mode; and a second sample and holder connected between the second amplifier and the parallel-to-serial converting unit and sample-and-holding the amplified pressure sensing signal.

The parallel-to-serial converting unit may include: a first parallel-to-serial converter operating in the normal mode; and a second parallel-to-serial converter operating in the power saving mode.

The first parallel-to-serial converter may convert the amplified photo sensing signal and the amplified pressure sensing signal into first serial sensing signals in synchronization with a first clock signal, and the second parallel-to-serial converter may convert the amplified pressure sensing signal into a second serial sensing signal in synchronization with a second clock signal having a frequency lower than the first clock signal.

The apparatus may further include a switch selecting one of the first parallel-to-serial converter and the second parallel-to-serial converter.

The first parallel-to-serial converter may not receive power from a power supply during the power saving mode, and the second parallel-to-serial converter may not receive power from a power supply during the normal mode.

The analog-to-digital converter may operate in synchronization with a first clock signal during the normal mode, and may operate in synchronization with a second clock signal having a frequency lower than the first clock signal during the power saving mode.

The apparatus may operate in the normal mode when it is determined from the pressure sensing signal that a touch is detected, and the apparatus may operate in the power saving mode when it is determined from the pressure sensing signal that there is no touch for a predetermined time.

In general, in another aspect, an apparatus for driving a display device including a photo sensing circuit and a pressure sensing circuit includes: a first amplifier amplifying a photo sensing signal from the photo sensing circuit; a second amplifier amplifying a pressure sensing signal from the pressure sensing circuit; a parallel-to-serial converter converting the amplified photo sensing signal and the amplified pressure sensing signal into serial sensing signals; and an analog-to-digital converter converting the serial sensing signals into digital sensing signals, wherein the first amplifier is selectively blocked from power supply based on the pressure sensing signal.

The apparatus may include: a first sample and holder connected between the first amplifier and the parallel-to-serial converter and sample-and-holding the amplified photo sensing signal, the first sample and holder being selectively blocked from power supply based on the pressure sensing signal; and a second sample and holder connected between the second amplifier and the parallel-to-serial converting unit and sample-and-holding the amplified pressure sensing signal.

The parallel-to-serial converter and the analog-to-digital converter may operate in synchronization with a selected one of a first clock signal and a second clock signal having a frequency lower than the first clock, and the selection of one of the first and the second clock signals may be based on the pressure sensing signal.

An apparatus of driving a display device including a photo sensing circuit and a pressure sensing circuit according to another embodiment of the present invention includes: an amplifier amplifying a photo sensing signal from the photo sensing circuit and a pressure sensing signal from the pressure sensing circuit; a parallel-to-serial converting unit converting the amplified photo sensing signal and the amplified pressure sensing signal into serial sensing signals; and an analog-to-digital converter converting the serial sensing signals into digital sensing signals, wherein the parallel-to-serial converting unit and the analog-to-digital converter operate in synchronization with a selected one of a first clock signal and a second clock signal having a frequency lower than the first clock signal, and the selection of one of the first and the second clock signals is based on the pressure sensing signal.

The parallel-to-serial converting unit may include: a first parallel-to-serial converter operating in synchronization with the first clock signal; and a second parallel-to-serial converter operating in synchronization with the second clock signal.

The first parallel-to-serial converter may convert the amplified photo sensing signal and the amplified pressure sensing signal into first serial sensing signals, and the second parallel-to-serial converter may convert the amplified pressure sensing signal into a second serial sensing signal.

The apparatus may further include a switch selecting one of the first parallel-to-serial converter and the second parallel-to-serial converter based on the pressure sensing signal.

In general, in another aspect, a display device includes: a plurality of display circuits; a plurality of photo sensing circuits; a plurality of pressure sensing circuits; a plurality of sensor data lines connected to the photo sensing circuits and the pressure sensing circuits; an image data driver converting image signals into data voltages and applying the data voltages to the display circuits; a sensing signal processor processing photo sensor data signals supplied from the photo sensing circuits and pressure sensor data signals supplied from the pressure sensing circuits, and operating in one of a normal mode and a power saving mode based on the pressure sensor data signals; and a signal controller receiving the image signals from an external device and controlling the image data driver and the sensing signal processor.

The sensing signal processor may include: a first amplifier amplifying the photo sensing signals; a second amplifier amplifying the pressure sensing signals; a first parallel-to-serial converter converting the amplified photo sensing signals and the amplified pressure sensing signals into first serial sensing signals; a second parallel-to-serial converter converting the amplified pressure sensing signals into second serial sensing signals; and an analog-to-digital converter converting the first and the second serial sensing signals into digital sensing signals.

The first amplifier may be blocked from power supply during the power saving mode.

The first parallel-to-serial converter may operate during the normal mode, and the second parallel-to-serial converter may operate during the power saving mode.

The first parallel-to-serial converter may operate in synchronization with a first clock signal, and the second parallel-to-serial converter may operate in synchronization with a second clock signal having a frequency lower than the first clock signal.

The first parallel-to-serial converter may be blocked from power supply during the power saving mode, and the second parallel-to-serial converter may be blocked from power supply during the normal mode.

The analog-to-digital converter may operate in synchronization with a first clock signal during the normal mode, and may operate in synchronization with a second clock signal having a frequency lower than the first clock signal during the power saving mode.

The image data driver, the sensing signal processor, and the signal controller may be integrated in a single integrated circuit chip.

In general, in another aspect, a method of driving a display device including a photo sensing circuit and a pressure sensing circuit includes: reading a first pressure sensing signal outputted from the pressure sensing circuit; determining whether a touch exists based on the first pressure sensing signal; reading a photo sensing signal outputted from the photo sensing circuit and a second pressure sensing signal outputted from the pressure sensing circuit; and determining whether a touch exists based on the second pressure sensing signal, wherein when it is determined from the first pressure signal that there is a touch, the reading of a photo sensing signal and a second pressure sensing signal is performed, and when it is determined from the second pressure signal that there is no touch for a predetermined time, the reading of a first pressure sensing signal is performed.

When it is determined from the first pressure signal that there is no touch, the reading of a first pressure sensing signal may be maintained, and when it is determined from the second pressure signal that there is a touch and an elapsed time is shorter than the predetermined time, the reading of a photo sensing signal and a second pressure sensing signal may be maintained.

The display device may further include an amplifier amplifying the photo sensing signal, and the reading of a first pressure sensing signal may further include: blocking power from being applied to the amplifier.

The display device may further include a parallel-to-serial converter converting the photo sensing signal and the first and the second pressure sensing signals into serial sensing signals and an analog-to-digital converter converting the serial sensing signals into digital sensing signals; the reading of a first pressure sensing signal may include: driving the parallel-to-serial converter and the analog-to-digital converter to operate in synchronization with a first clock signal; and the reading of a photo sensing signal and a second pressure sensing signal may include: driving the parallel-to-serial converter and the analog-to-digital converter to operate in synchronization with a second clock signal having a frequency higher than the first clock signal.

The display device may further include a first parallel-to-serial converter converting the photo sensing signal and the second pressure sensing signal into serial signals and a second parallel-to-serial converter converting the first pressure sensing signal into a serial signal; the reading of a first pressure sensing signal may include: blocking power from being applied to the first parallel-to-serial converter; and the reading of a photo sensing signal and a second pressure sensing signal may include: blocking power from being applied to the second parallel-to-serial converter.

BRIEF DESCRIPTION OF THE DRAWINGS

The present invention will become more apparent by describing embodiments thereof in detail with reference to the accompanying drawing in which.

DETAILED DESCRIPTION OF THE PREFERRED EMBODIMENTS

Figure 1:
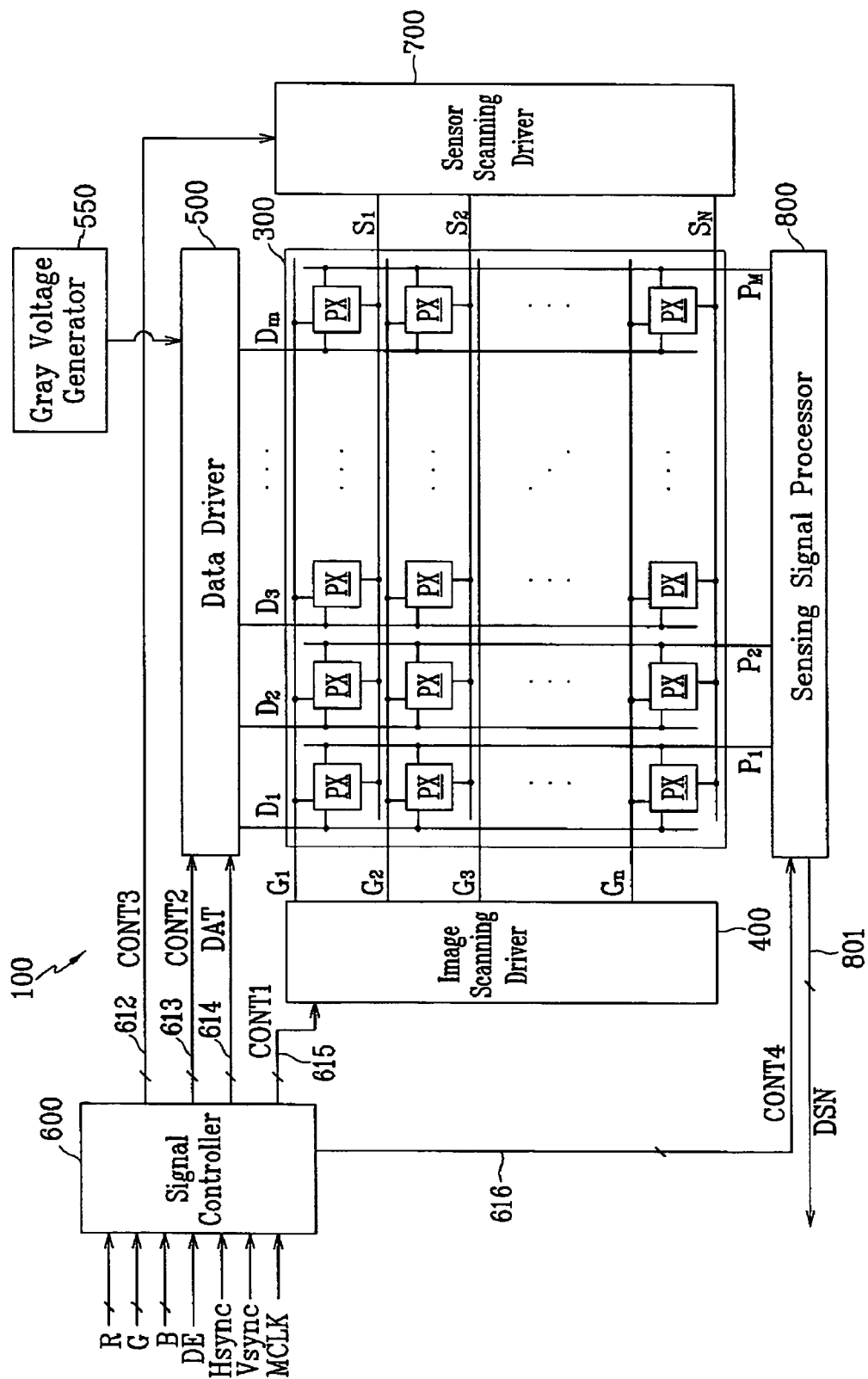
FIG. 1 is a block diagram of an LCD according to an embodiment of the present invention.

The present invention now will be described more fully hereinafter with reference to the accompanying drawings, in which preferred embodiments of the invention are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

FIGS. 1, 2, 3, 4, and 5 illustrate an embodiment of a touch detectable display device comprising an LCD 100.

Figure 2:
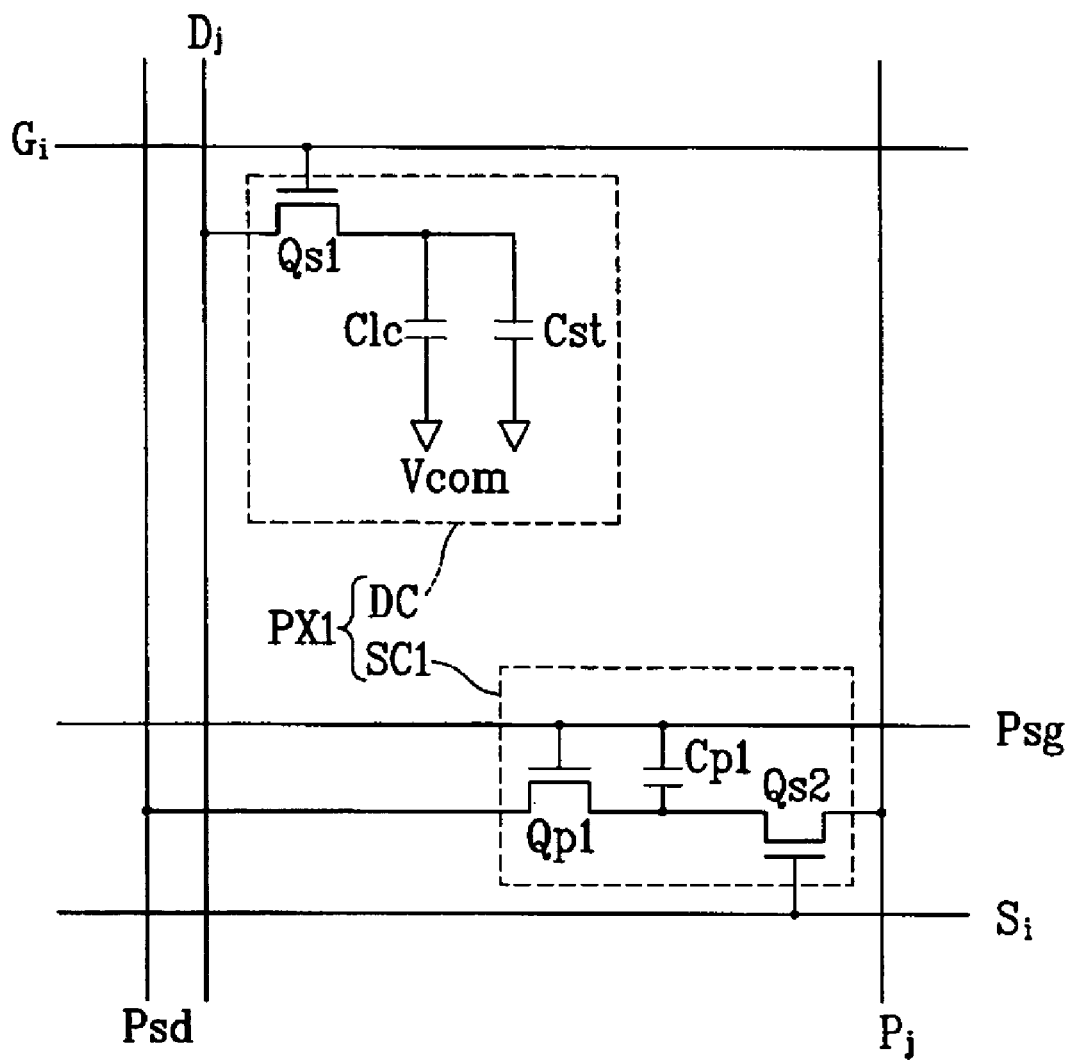
FIG. 2 is an equivalent circuit diagram of a pixel including a photo sensing circuit of an LCD according to an embodiment of the present invention.
Figure 3:
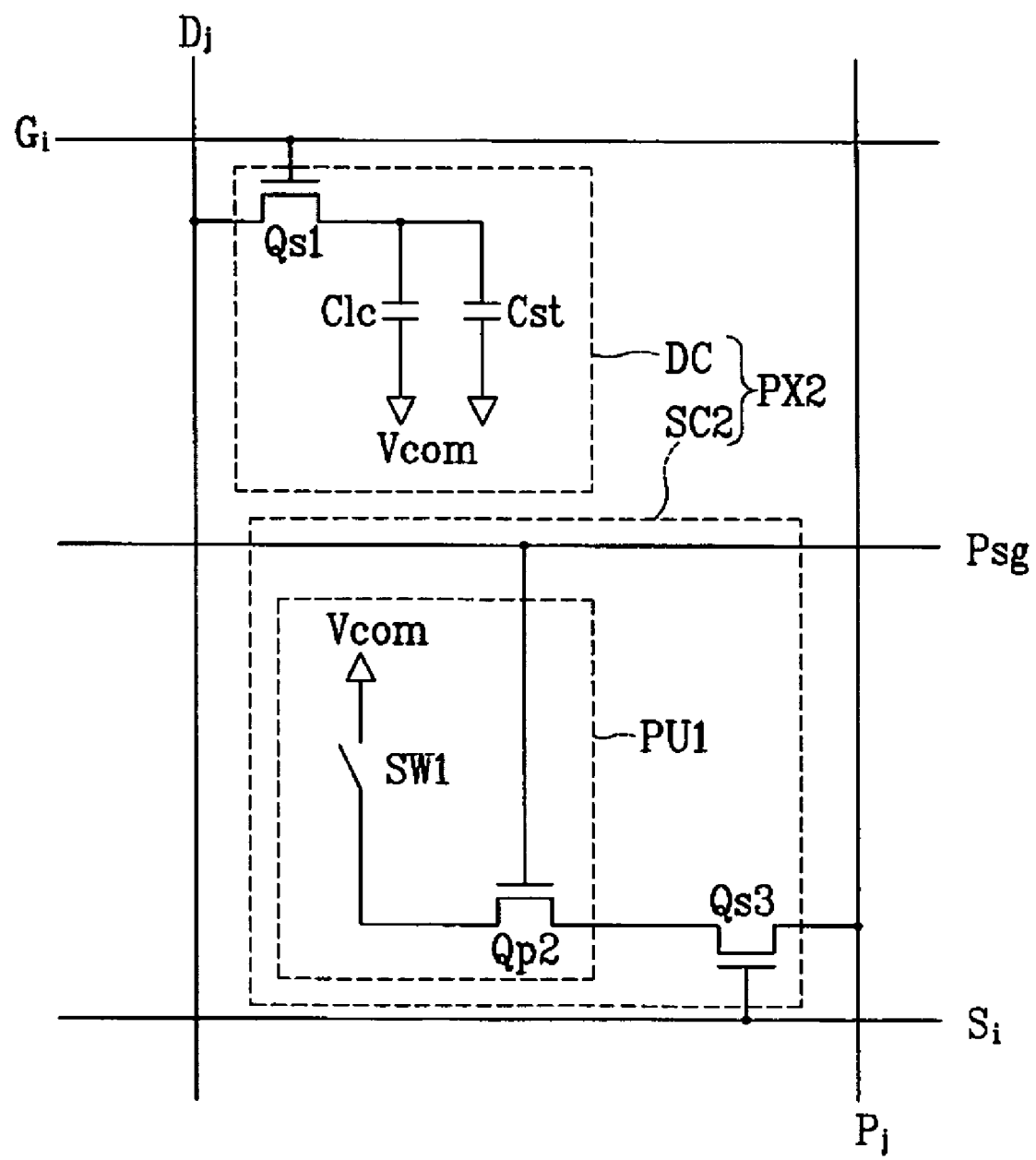
FIG. 3 is an equivalent circuit diagram of a pixel including a pressure sensing circuit of an LCD according to an embodiment of the present invention.
Figure 4:
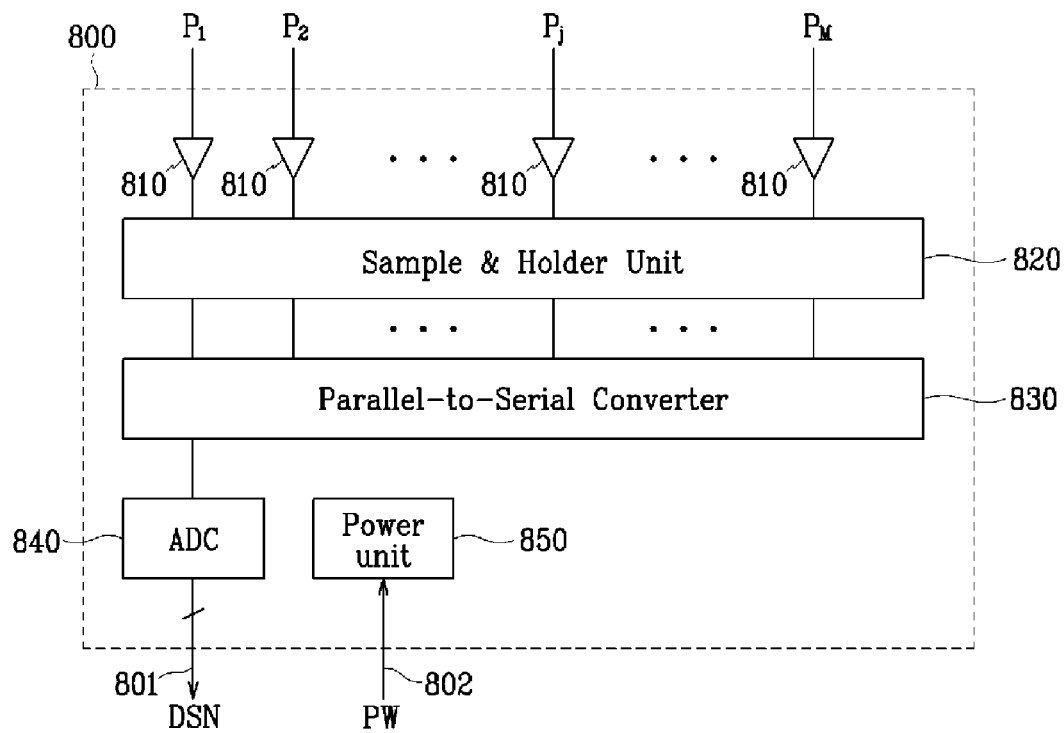
FIG. 4 is a block diagram of an integrated circuit (IC) including a sensing signal processor according to an embodiment of the present invention.
Figure 5:
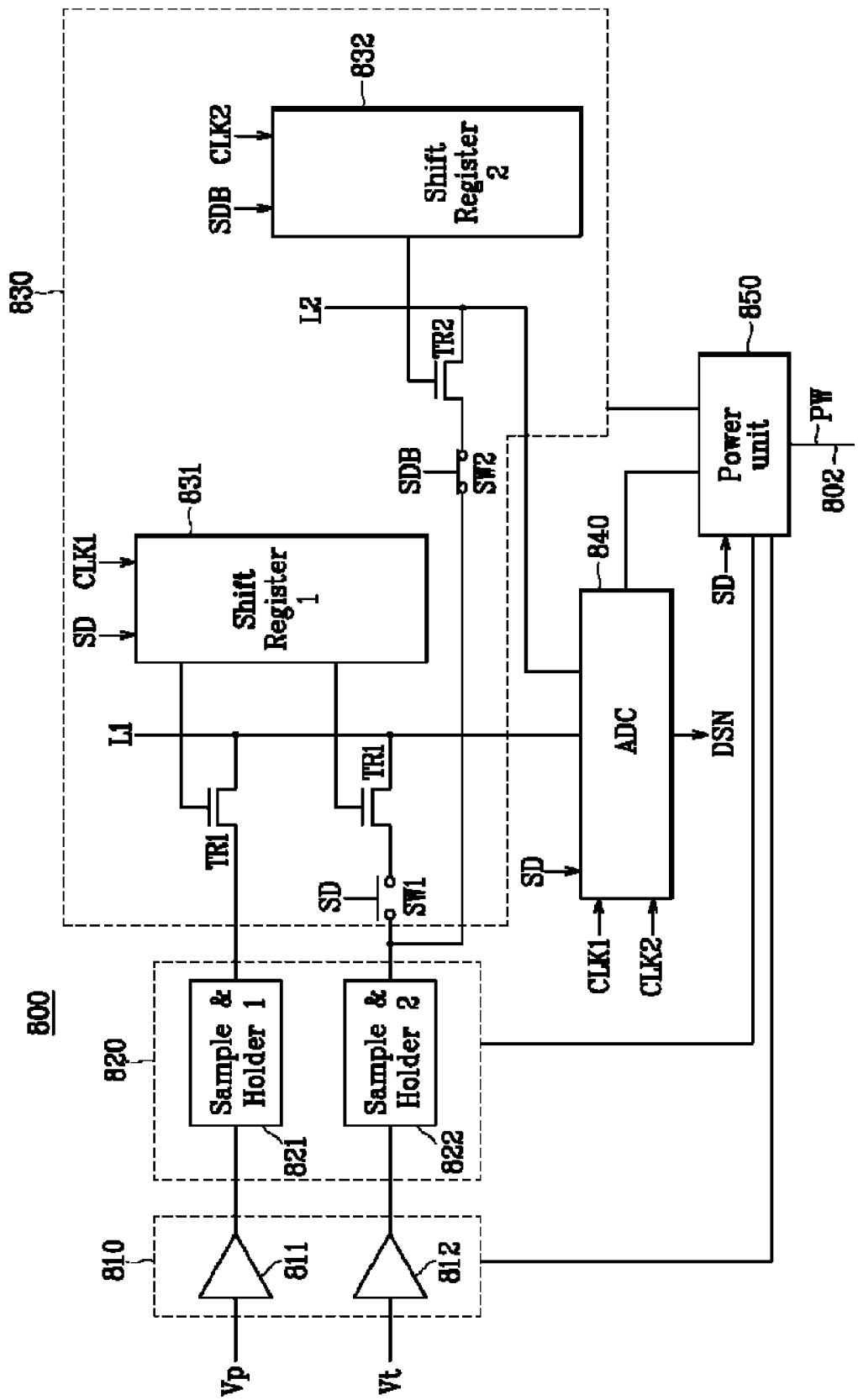
FIG. 5 is a schematic diagram of a sensing signal processor according to an embodiment of the present invention.
Figure 6:
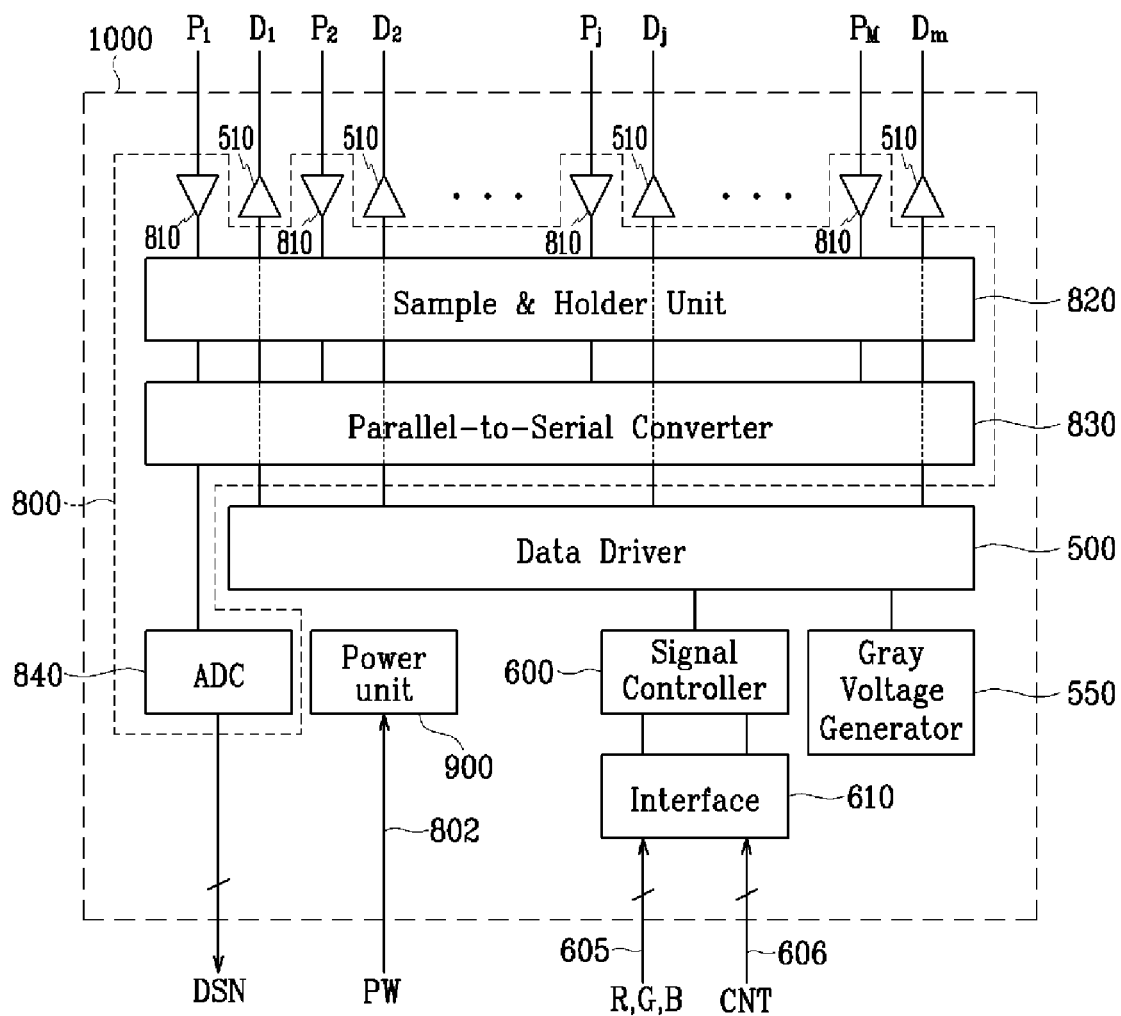
FIG. 6 is a block diagram of a complex IC chip including a sensing signal processor.

FIG. 1 is a block diagram of LCD 100 according to an embodiment of the present invention, FIG. 2 is an equivalent circuit diagram of a pixel including a photo sensing circuit of LCD 100 according to an embodiment of the present invention, and FIG. 3 is an equivalent circuit diagram of a pixel including a pressure sensing circuit of LCD 100 according to an embodiment of the present invention. FIG. 4 is a block diagram of an integrated circuit (IC) including a sensing signal processor according to an embodiment of the present invention, FIG. 5 is a schematic diagram of a sensing signal processor according to an embodiment of the present invention, and FIG. 6 is a block diagram of a complex IC chip including a sensing signal processor.

Referring to FIG. 1, an LCD 100 according to an embodiment includes a liquid crystal (LC) panel assembly 300, an image scanning driver 400, an image data driver 500, a sensor scanning driver 700, and a sensing signal processor 800 that are coupled with the panel assembly 300, a gray voltage generator 550 coupled to the image data driver 500, and a signal controller 600 controlling the above elements.

Referring to FIGS. 1-3, the panel assembly 300 includes a plurality of display signal lines $G_1$-$G_n$ and $D_1$-$D_m$, a plurality of sensor signal lines $S_1$-$S_N$, $P_1$-$P_M$, Psg and Psd, and a plurality of pixels PX. The pixels PX are connected to the display signal lines $G_1$-$G_n$ and $D_1$-$D_m$ and the sensor signal lines $S_1$-$S_N$, $P_1$-$P_M$, Psg and Psd and arranged substantially in a matrix.

The display signal lines include a plurality of image scanning lines $G_1$-$G_n$ transmitting image scanning signals and a plurality of image data lines $D_1$-$D_m$ transmitting image data signals.

The sensor signal lines include a plurality of sensor scanning lines $S_1$-$S_N$ transmitting sensor scanning signals, a plurality of sensor data lines $P_1$-$P_M$ transmitting sensor data signals, a plurality of control voltage lines Psg transmitting a sensor control voltage, and a plurality of input voltage lines Psd transmitting a sensor input voltage.

The image scanning lines $G_1$-$G_n$ and the sensor scanning lines $S_1$-$S_N$ extend substantially in a row direction and substantially parallel to each other, while the image data lines $D_1$-$D_m$ and the sensor data lines $P_1$-$P_M$ extend substantially in a column direction and substantially parallel to each other.

Referring to FIGS. 2 and 3, each pixel PX, for example, a pixel PX1 or PX2 in the i-th row (i=1, 2, . . . , n) and the j-th column (j=1, 2, . . . , m) includes a display circuit DC connected to display signal lines $G_i$ and $D_j$. At least some of the pixels further include at least one of a photo sensing circuit and a pressure sensing circuit. For example, PX1 includes a photo sensing circuit SC1 connected to sensor signal lines $S_i$, $P_j$, Psg and Psd, while PX2 includes a pressure sensing circuit SC2 connected to sensor signal lines $S_i$, $P_j$ and Psg. However, fewer than all of the pixels PX may include the sensing circuits SC1 or SC2. In other words, the concentration of the sensing circuits SC1 and SC2 may be varied and thus the number N of the sensor scanning lines $S_1$-$S_N$ and the number M of the sensor data lines $P_1$-$P_M$ may be varied.

For example, it is assumed that the resolution of the LCD is equivalent to QVGA (quarter video graphics array) resolution (240×320 dots). When the resolution of the sensing circuits SC1 and SC2 is equivalent to QVGA, one sensing circuit is assigned to every three pixels PX. When the resolution of the sensing circuits SC1 and SC2 is equivalent to QQVGA (quarter QVGA) (120×160 dots), one sensing circuit is assigned to every twelve pixels PX. Here, one dot is a basic unit for representing a color, and includes a set of three pixels for color components; for example, red, green, and blue pixels.

The sensing circuits SC1 and/or SC2 may be separated from the pixels PX and may be provided between the pixels PX or in a separately prepared area. A photo sensing circuit SC1 and a pressure sensing circuit SC2 may be connected to the same sensor data line $P_j$, but it is preferable that the photo sensing circuit SC1 and the pressure sensing circuit SC2 are connected to different sensor data lines.

The display circuit DC includes a switching element Qs1 connected to an image scanning line $G_i$ and an image data line $D_j$, and a LC capacitor Clc and a storage capacitor Cst that are connected to the switching element Qs1. The storage capacitor Cst may be omitted.

The switching element Qs1 has three terminals, i.e., a control terminal connected to the image scanning line $G_i$, an input terminal connected to the image data line $D_j$, and an output terminal connected to the LC capacitor Clc and the storage capacitor Cst.

The LC capacitor Clc includes a pair of terminals and a liquid crystal layer (not shown) interposed therebetween and it is connected between the switching element Qs1 and a common voltage Vcom. The two terminals of the LC capacitor Clc may be disposed on two panels (not shown) of the panel assembly 300. One of the two terminals is often referred to as a pixel electrode, and the other of the two terminals is often referred to as a common electrode. The common electrode often covers an entire area of one of the two panels and is supplied with a common voltage Vcom. However, the pixel electrode and the common electrode may be provided on the same panel, and in this case, at least one of the pixel electrode and the common electrode has a shape of bar or stripe.

In embodiments employing a storage capacitor, the storage capacitor Cst assists the LC capacitor Clc and is connected between the switching element Qs1 and a predetermined voltage such as the common voltage Vcom. The storage capacitor Cst may include the pixel electrode and a separate signal line, which is provided on one of the two panels and overlaps the pixel electrode via an insulator. Alternatively, the storage capacitor Cst includes the pixel electrode and an adjacent image scanning line called a previous image scanning line, which overlaps the pixel electrode via an insulator.

For a color display, each pixel PX uniquely represents one of primary colors (i.e., spatial division) or each pixel PX sequentially represents the primary colors in turn (i.e., temporal division) such that a spatial or temporal sum of the primary colors is recognized as a desired color. An example of a set of the primary colors includes red, green, and blue colors. In an example of the spatial division technique, each pixel PX includes a color filter representing one of the primary colors in an area facing the pixel electrode The photo sensing circuit SC1 shown in FIG. 2 includes a photo sensing element Qp1 connected to a control voltage line Psg and an input voltage line Psd, a sensor capacitor Cp1 connected to the photo sensing element Qp1, and a switching element Qs2 connected to a sensor scanning line $S_i$, the photo sensing element Qp1, and a sensor data line $P_j$.

The photo sensing element Qp1 has three terminals, i.e., a control terminal connected to the control voltage line Psg to be biased by the sensor control voltage, an input terminal connected to the input voltage line Psd to be biased by the sensor input voltage, and an output terminal connected to the switching element Qs2. The photo sensing element Qp1 includes a photoelectric material that generates a photocurrent upon receipt of light. An example of the photo sensing element Qp1 is a thin film transistor having an amorphous silicon or polysilicon channel that can generate a photocurrent. The sensor control voltage applied to the control terminal of the photo sensing element Qp1 is sufficiently low or sufficiently high to keep the photo sensing element Qp1 in an off state without incident light. The sensor input voltage applied to the input terminal of the photo sensing element Qp1 is sufficiently high or sufficiently low to keep the photocurrent flowing in a direction. For example, the sensor input voltage is sufficiently high or sufficiently low so that the photocurrent flows toward the switching element Qs2 and flows into the sensor capacitor Cp1 to charge the sensor capacitor Cp1.

The sensor capacitor Cp1 is connected between the control terminal and the output terminal of the photo sensing element Qp1. The sensor capacitor Cp1 stores electrical charges output from the photo sensing element Qp1 to substantially maintain a predetermined voltage. The sensor capacitor Cp1 may be omitted.

The switching element Qs2 also has three terminals, i.e., a control terminal connected to the sensor scanning line $S_i$, an input terminal connected to the output terminal of the photo sensing element Qp1, and an output terminal connected to the sensor data line $P_j$. The switching element Qs2 outputs a sensor output signal to the sensor data line $P_j$ in response to the sensor scanning signal from the sensor scanning line $S_i$. The sensor output signal is a sensing current from the photo sensing element Qp1. However, the sensor output signal may be a voltage stored in the sensor capacitor Cp1.

The pressure sensing circuit SC2 shown in FIG. 3 includes a pressure sensing element PU1 connected to the common voltage Vcom and a control voltage line Psg, and a switching element Qs3 connected to a sensor scanning line $S_i$, the pressure sensing element PU1, and a sensor data line $P_j$.

The pressure sensing element PU1 includes a pressure switch SW1 connected to the common voltage Vcom and a driving transistor Qp2 connected between the switch SW1 and the switching element Qs3.

The pressure switch SW1 connects the driving transistor Qp2 to the common voltage Vcom under a pressure initiated by a touch exerted on the panel assembly 300. For example, the pressure may make an electrode (not shown) supplied with the common voltage Vcom approach a terminal of the driving transistor Qp2 to be in contact therewith. However, the switch SW1 may use another physical quantity for connecting the driving transistor Qp2 to the common voltage Vcom and in this case, the pressure sensing element PU1 and the pressure switch SW1 may be referred to using names indicative of the physical quantity.

The driving transistor Qp2 has three terminals, i.e., a control terminal connected to the control voltage line Psg to be biased by the sensor control voltage, an input terminal connected to the switch SW1, and an output terminal connected to the switching element Qs3. The driving transistor Qp2 generates and outputs an electrical current upon receipt of the common voltage Vcom from the switch SW1.

The switching element Qs3 also has three terminals, i.e., a control terminal connected to the sensor scanning line $S_i$, an input terminal connected to the output terminal of the driving transistor Qp2, and an output terminal connected to the sensor data line $P_j$. The switching element Qs3 outputs the current from the driving transistor Qp2 to the sensor data line $P_j$ as a sensor output signal in response to the sensor scanning signal from the sensor scanning line $S_i$.

The switching elements Qs1, Qs2 and Qs3, the photo sensing element Qp1, and the driving transistor Qp2 may include amorphous silicon or polysilicon thin film transistors (TFTs).

The pressure sensing circuit SC2 can correctly identify the existence of a touch, but it may not identify the precise position of the touch since the pressure following the touch may cover a wide area. By contrast, the photo sensing circuit SC1 can identify the precise position of a touch of an object by sensing the variation of light illuminance caused by a shadow of the object, while it may not correctly identify the existence of the touch since the variation of illuminance can be generated by various causes other than a touch. For example, the illuminance may vary due to the presence of an object disposed near the panel assembly 300 that does not touch the panel assembly 300.

In order to reduce the time for processing sensor output signals, the resolution of the sensing circuits may be made as small as practical. In particular, the resolution of the pressure sensing circuits is preferably smaller than the resolution of the photo sensing circuits, since the determination of the existence of a touch can be appropriately performed under a low resolution of the pressure sensing circuits. That is, the system may be configured so that the resolution of the sensing circuits is high enough to reliably and accurately determine a user input based on detection of a touch at a touch position. The resolution need not be as high as the LCD resolution, which is selected to provide a desired image quality.

One or more polarizers (not shown) are provided at the panel assembly 300.

The gray voltage generator 550 generates two sets of gray voltages related to a transmittance of the pixels. The gray voltages in a first set have a positive polarity with respect to the common voltage Vcom, while the gray voltages in a second set have a negative polarity with respect to the common voltage Vcom.

The image scanning driver 400 is connected to the image scanning lines $G_1$-$G_n$ of the panel assembly 300 and synthesizes a gate-on voltage and a gate-off voltage to generate the image scanning signals for application to the image scanning lines $G_1$-$G_n$.

The image data driver 500 is connected to the image data lines $D_1$-$D_m$ of the panel assembly 300 and applies image data signals selected from the gray voltages to the image data lines $D_1$-$D_m$.

The sensor scanning driver 700 is connected to the sensor scanning lines $S_1$-$S_N$ of the panel assembly 300 and synthesizes a gate-on voltage and a gate-off voltage to generate the sensor scanning signals for application to the sensor scanning lines $S_1$-$S_N$.

The sensing signal processor 800 is connected to the sensor data lines $P_1$-$P_M$ of the display panel 300 and receives and analog-to-digital converts the sensor data signals from the sensor data lines $P_1$-$P_M$ to generate digital sensor data signals DSN. The sensor data signals carried by the sensor data lines $P_1$-$P_M$ may be current signals and in this case, the sensing signal processor 800 converts the current signals into voltage signals before the analog-to-digital conversion. One sensor data signal carried by one sensor data line $P_1$-$P_M$ at a time may include one sensor output signal from one switching elements Qs2 or may include at least two sensor output signals outputted from at least two switching elements Qs2.

The signal controller 600 controls the image scanning driver 400, the image data driver 500, the sensor scanning driver 700, and the sensing signal processor 800, etc.

Each of the processing units 400, 500, 600, 700 and 800 may include at least one integrated circuit (IC) chip mounted on the LC panel assembly 300 or on a flexible printed circuit (FPC) film in a tape carrier package (TCP), which may be attached to the panel assembly 300. Alternately, at least one (and/or a portion thereof) of the processing units 400, 500, 600, 700 and 800 may be integrated into the panel assembly 300 along with the signal lines $G_1$-$G_n$, $D_1$-$D_m$, $S_1$-$S_N$, $P_1$-$P_M$, Psg and Psd, the switching elements Qs1, Qs2 and Qs3, and the photo sensing elements Qp1. Alternatively, all the processing units 400, 500, 600, 700 and 800 may be integrated into a single IC chip, but at least one of the processing units 400, 500, 600, 700 and 800 or at least one circuit element in at least one of the processing units 400, 500, 600, 700 and 800 may be disposed out of the single IC chip.

The LCD may further include a touch determination unit (not shown) receiving the digital sensor data signals DSN from the sensing signal processor 800 on a bus 801 and determining whether and where a touch exists. The touch determination unit may be included in the signal controller 600 or may be implemented differently (for example, as an independent IC chip).

Referring to FIG. 4, a sensing signal processor 800 may be implemented as a single IC chip including a plurality of amplifiers 810, a sample and holder unit 820, a parallel-to-serial converter 830, an analog-to-digital converter 840, and a power unit 850. In the embodiment illustrated in FIG. 4, the amplifiers 810, the sample and holder unit 820, the parallel-to-serial converter 830, and an analog-to-digital converter 840 are connected in series.

Referring to FIG. 5, the amplifiers 810 includes a predetermined number x of first amplifiers 811 and another predetermined number y of second amplifiers 812. The first amplifiers 811 are connected to first sensor data lines $P_1$-$P_M$ connected to the photo sensing circuits SC1 and receive, amplify, and filter photo sensor data signals Vp from the first sensor data lines $P_1$-$P_M$. The second amplifiers 812 are connected to second sensor data lines $P_1$-$P_M$ connected to the pressure sensing circuits SC2, and receive, amplify, and filter pressure sensor data signals Vt from the second sensor data lines $P_1$-$P_M$. The number x corresponds to horizontal resolution of the photo sensing circuits SC1, and the number y (=M−x) corresponds to horizontal resolution of the pressure sensing circuits SC2.

The sample and holder unit 820 includes a first sample and holder 821 and a second sample and holder 822. The first/second sample and holder 821/822 is coupled with the first/second amplifiers 811/812 and sample-and-holds the amplified photo/pressure sensor data signals Vp/Vt.

The parallel-to-serial converter 830 includes first switching transistors TR1, second switching transistors TR2, first switches SW1, second switches SW2, a first shift register 831, and a second shift register 832. The parallel-to-serial converter 830 converts the processed sensor data signals Vp and Vt from the sample and holder unit 820 into serial signals.

Each of the first switching transistors TR1 has three terminals, i.e., an input terminal connected to the first or the second sample and holder 821 or 822, an output terminal connected to a signal line L1, and a control terminal connected to the first shift register 831. The first switching transistors TR1 output the processed sensor data signals Vp and Vt to the analog-to-digital converter 840 in synchronization with clock pulses from the first shift register 831.

Each of the second switching transistors TR2 has three terminals, i.e., an input terminal connected to the second sample and holder 822, an output terminal connected to a signal line L2, and a control terminal connected to the second shift register 832. The second switching transistors TR2 output the processed pressure sensor data signals Vt to the analog-to-digital converter 840 in synchronization with clock pulses from the second shift register 832.

The first shift register 831 operates in response to a selection signal SDB and outputs clock pulses to the first switching transistors TR1 in synchronization with a first clock signal CLK1. The processed sensor data signals Vp and Vt are serially inputted into the analog-to-digital converter 840 through the first switching transistors TR1 that turn on in sequence.

The second shift register 832 operates in response to an inversion signal SDB having a voltage waveform inverted from the selection signal SD outputs clock pulses to the second switching transistors TR2 in synchronization with a second clock signal CLK2. The processed pressure sensor data signals Vt are serially inputted into the analog-to-digital converter 840 through the second switching transistors TR2 that turn on in sequence.

The frequency f2 of the second clock signal CLK2 is lower than the frequency f1 of the first clock signal CLK1. For example, when x=2×y, f1=3×f2.

The first switch SW1 is connected between the second sample and holder 822 and the first switching transistor TR1, and transmits the pressure sensor data signal Vt to the first switching transistor TR1 in response to the selection signal SD.

On the other hand, the second switch SW2 is connected between the second sample and holder 822 and the second switching transistor TR2, and transmits the pressure sensor data signal Vt to the second switching transistor TR2 in response to the inversion signal SDB.

In some embodiments, the second shift register 832 and the second switch SW2 may include an inverter (not shown) such that they operates in response to the selection signal SD instead of the inversion signal SDB.

The first switch SW1 and the second switch SW2 may form a single switch, which transmits the pressure sensor data signal Vt to one of the first and the second switching transistors TR1 and TR2 in response to the selection signal SD.

The analog-to-digital converter 840 receives signals from the first signal line L1 and the second signal line L2 in response to the selection signal SD. The analog-to-digital converter 840 also selects one of the first clock signal CLK1 and the second clock signal CLK2 in response to the selection signal SD and operates in synchronization with the selected clock signal CLK1 or CLK2. The analog-to-digital converter 840 converts the sensor data signals Vp and Vt inputted through the first signal line L1 into the digital sensor data signals DSN in synchronization with the first clock signal CLK1, or converts the pressure sensor data signals Vp inputted through the second signal line L2 into the digital sensor data signals DSN in synchronization with the second clock signal CLK2. The analog-to-digital converter 840 includes a multiplexer (not shown) for selecting one of the first and the second clock signals CLK1 and CLK2 and for selecting one of the first and the second signal lines L1 and L2.

The power unit 850 is supplied with power PW on a line 802 from an external source and provides the power for the driving blocks 810-840, the amplifiers 811, and blocks the power supplied to the first sample and holder 821 and the first shift register 831, or the power supplied to the second shift register 832 in response to the selection signal SD.

Meanwhile, the image data driver 500, the sensing signal processor 800, and the signal controller 600 are integrated into a complex IC 1000 as shown in FIG. 6. The complex IC 1000 may be implemented as a single chip as shown in FIG. 5.

A complex IC 1000 shown in FIG. 6 includes a gray voltage generator 550, an image data driver 500, a plurality of output buffers 510, an interface 610, a signal controller 600, a sensing signal processor 800, and a power unit 900. The sensing signal processor 800 includes amplifiers 810, a sample and holding unit 820, a parallel-to-serial converter 830, and an analog-to-digital converter 840. The above-described touch determination unit may be also integrated into the complex IC 1000.

The gray voltage generator 550, the image data driver 500, and the signal controller 600 have substantially the same function as described above and the detailed description thereof will be omitted.

The output buffers 510 are connected to data lines $D_1$-$D_m$, and are configured to output image data voltages from the image data driver 500 to the data lines $D_1$-$D_m$.

The number of the output buffers 510 is determined by the numbers of the data lines $D_1$-$D_m$, while the number of the amplifiers 810 is determined by the number of the sensor data lines $P_1$-$P_M$. In the above-described examples, when both the resolutions of the LCD and the sensing circuits are equivalent to QVGA, the number of the output buffers 510 is three times the number of the amplifiers 810. For this example, output terminals of the complex IC 1000 coupled to the output buffers 510 and input terminals of the complex IC 1000 coupled to the amplifiers 810 are alternately arranged in a manner that one input terminal is provided for every three output terminals. When the resolution of the LCD is equivalent to QVGA, and the resolution of the sensing circuits C1 and C2 is equivalent to QQVGA, one input terminal is provided for every six output terminals. However, the arrangement of the output terminals and the input terminals of the complex IC 1000 in association with the output buffers 510 and the amplifiers 810 may be varied according to the arrangement of the sensing circuits C1 and C2.

The interface 610 receives input image signals R, G and B on a bus 605 and input control signals CNT on a bus 606 from an external device and converts the received signals R, G and B and CNT to be processible by the signal controller 600, etc.

The power unit 900 receives power PW on a power line 802 from an external source and supplies the power PW to driving blocks in the complex IC 1000. Referring to FIGS. 5 and 6, the power unit blocks the power supplied to the first amplifiers 811, the first sample and holder 821, and the first shift register 831, or the power supplied to the second shift register 832.

The integration of the units 500, 600, 800 and 900 into the complex IC 1000 may decrease the size of the panel assembly 300, the power consumption, and the manufacturing cost.

At least one of the processing units 500, 600, 800 and 900 or at least one circuit element in at least one of the processing units 500, 600, 800 and 900 may be disposed out of the single IC chip. Alternately, the image scanning driver 400 or the sensor scanning driver 700 may be also incorporated into the complex IC 1000. The complex IC 1000 may further include latches, registers, memories, and/or other additional elements for display operation and sensing operation.

Now, the operation of the above-described LCD will be described in detail, referring to FIGS. 1-6.

The signal controller 600 is supplied with input image signals R, G and B on bus 605 and input control signals CNT on bus 606 for controlling the display thereof from an external graphics controller (not shown). The input control signals CNT include a vertical synchronization signal Vsync, a horizontal synchronization signal Hsync, a main clock MCLK, and a data enable signal DE.

On the basis of the input control signals CNT and the input image signals R, G and B, the signal controller 600 generates image scanning control signals CONT1, image data control signals CONT2, sensor scanning control signals CONT3, and sensor data control signals CONT4, and it processes the image signals R, G and B to be used for the operation of the display panel 300. The signal controller 600 sends the scanning control signals CONT1 to the image scanning driver 400 on bus 615, the processed image signals DAT and the data control signals CONT2 to the image data driver 500 on bus 614 and 613, respectively, the sensor scanning control signals CONT3 to the sensor scanning driver 700 on bus 612, and the sensor data control signals CONT4 to the sensing signal processor 800 on bus 616.

The image scanning control signals CONT1 include an image scanning start signal STV for signaling a start of image scanning and at least one clock signal for controlling the output time of the gate-on voltage. The image scanning control signals CONT1 may include an output enable signal OE for defining the duration of the gate-on voltage.

The image data control signals CONT2 include a horizontal synchronization start signal STH for signaling the start of image data transmission for a group of pixels PX, a load signal LOAD for initiating the application of the image data signals to the image data lines $D_1$-$D_m$, and a data clock signal HCLK. The image data control signal CONT2 may further include an inversion signal RVS for reversing the polarity of the image data signals (with respect to the common voltage Vcom).

Responsive to the image data control signals CONT2 from the signal controller 600, the image data driver 500 receives a packet of the digital image signals DAT for the group of pixels PX from the signal controller 600, converts the digital image signals DAT into analog image data signals, and applies the analog image data signals to the image data lines $D_1$-$D_m$.

The image scanning driver 400 applies the gate-on voltage to an image scanning line $G_1$-$G_n$ in response to the image scanning control signals CONT1 from the signal controller 600, thereby turning on the switching transistors Qs1 connected thereto. The image data signals applied to the image data lines $D_1$-$D_m$ are then supplied to the display circuit DC of the pixels PX through the activated switching transistors Qs1.

The difference between the voltage of an image data signal and the common voltage Vcom is represented as a voltage across the LC capacitor Clc, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts the light polarization into the light transmittance to display images.

By repeating this procedure by a unit of a horizontal period (also referred to as "1H" and equal to one period of the horizontal synchronization signal Hsync and the data enable signal DE), all image scanning lines $G_1$-$G_n$ are sequentially supplied with the gate-on voltage, thereby applying the image data signals to all pixels PX to display an image for a frame.

When the next frame starts after one frame finishes, the inversion control signal RVS applied to the image data driver 500 is controlled such that the polarity of the image data signals is reversed (which is referred to as "frame inversion"). The inversion control signal RVS may be also controlled such that the polarity of the image data signals flowing in a data line are periodically reversed during one frame (for example, row inversion and dot inversion), or the polarity of the image data signals in one packet are reversed (for example, column inversion and dot inversion).

The sensor scanning control signals CONT3 include a sensor scanning start signal for signaling a start of sensor scanning and at least one clock signal for controlling the output time of the gate-on voltage onto the sensor scanning lines $S_1$-$S_N$.

The sensor data control signals CONT4 includes a selection signal SD, an inversion signal SDB, and clock signals CLK1 and CLK2 (as shown in FIG. 5).

The sensor scanning driver 700 applies the gate-on voltage to the sensor scanning lines $S_1$-$S_N$ to turn on the switching elements Qs2 and Qs3 connected thereto in response to the sensing control signals CONT3. Then, the switching elements Qs2 and Qs3 output sensor output signals to the sensor data lines $P_1$-$P_M$ to form sensor data signals Vp and Vt, and the sensor data signals Vp and Vt are input into the sensing signal processor 800.

The sensor data signals Vp and Vt are amplified and filtered to have suitable levels by the amplifiers 810 and sampled-and-held by the sample and holding unit 820. The sampled-and-held sensor data signals are converted into serial signals by the parallel-to-serial converter 830, and the parallel analog sensor data signals are then converted into digital sensor data signals DSN by the analog-to-digital converter 840 to be sent to a touch determination unit. The touch determination unit appropriately processes the digital sensor data signals DSN to determine touch information indicative of the detection of a touch and the position of the detected touch. The touch determination unit outputs touch information to an external device. The external device send image signals generated based on information about the touch to the LCD.

Now, a method of driving an LCD with reduced power consumption according to an embodiment of the present invention will be described with reference to FIG. 7.

Figure 7:
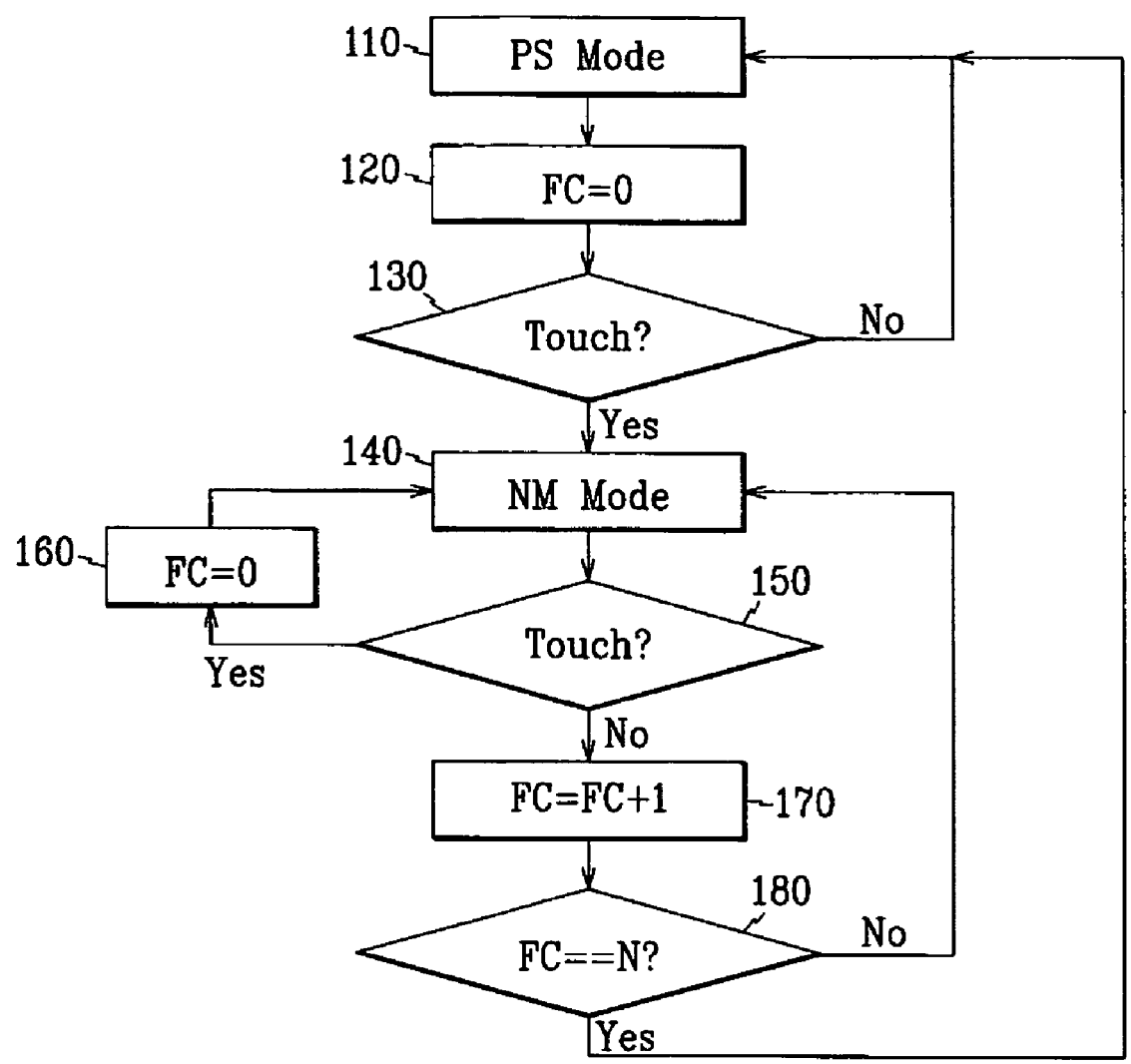
FIG. 7 is a flow chart illustrating a method of driving an LCD according to an embodiment of the present invention.

FIG. 7 is a flow chart illustrating a method of driving an LCD according to an embodiment of the present invention.

The LCD according to an embodiment of the present invention performs a sensing operation in two modes, i.e., in a normal mode NM or a power saving mode FS. The selection of the normal mode NM or the power saving mode PS may be determined by the selection signal SD and/or the inversion signal SDB.

Referring to FIG. 7, the LCD starts its operation in the power saving mode PS (10).

In the power saving mode PS, the switch SW1 is turned off, while the switch SW2 is turned on. The first shift register 831 is disabled, while the second shift register 832 is enabled. The first shift register 831, the first amplifiers 811, and the first sample and holder 821 are blocked from the power PW, while the second shift register 832 is supplied with the power PW. The second shift register 832 and the analog-to-digital converter 840 operate according to the second clock signal CLK2. In the power saving mode PS, only the pressure sensor data signals Vt are processed to be converted into the digital sensor data signals DSN, thereby determining whether a touch exists.

Therefore, in the power saving mode PS, the first amplifiers 811, the first sample and holder 821, and the first shift register 831 are not supplied with the power PW, reducing power consumption. In addition, the second shift register 832 and the analog-to-digital converter 840 operate in synchronization with the second clock signal CLK2 having relatively low frequency to further reduce the power consumption.

A frame counter FC is initialized into zero (20). The frame counter FC is a variable for counting the number of frames. The frame counter FC is used to initiate a change from the normal mode NM into the power saving mode PS.

The system determines whether a touch is detected during the power saving mode PS (30).

If the system determines that a touch is not detected, the LCD maintains the power saving mode PS (10) and continues to determine whether a touch is detected. When it is determined that a touch is detected, the LCD converts the operation mode into the normal mode NM (40).

In the normal mode NM, the switch SW1 is turned on, while the switch SW2 is turned off. The first shift register 831 is enabled, while the second shift register 832 is disabled. In addition, the first shift register 831 is powered, while the second shift register 832 is cut off from the power. The first shift register 831 and the analog-to-digital converter 840 operate according to the first clock signal CLK1. In the normal mode NM, the sensor data signals Vp and Vt are processed to be converted into the digital sensor data signals DSN to determine detection of a touch and its position. The system determines whether a touch is detected during the normal mode NM (50).

When it is determined that a touch is detected, the frame counter FC is initialized into zero (60), the normal mode NM is maintained (40), and the system continues to determine whether a touch is detected and, if so, its associated position. When it is determined that a touch is not detected, the frame counter FC is increased by one (70). Thereafter, a value of the frame counter FC is compared with a predetermined value N (80). When the value of the frame counter FC is different from the predetermined value N, the normal mode NM is maintained (40). On the contrary, the value of the frame counter FC is equal to the predetermined value N, the operation mode is converted into the power saving mode PS (10). Here, the predetermined value N is a natural number.

To summarize, when a touch is detected during the power saving mode PS, the operation mode is converted into the normal mode NM, and when there is no touch for a predetermined time during the normal mode NM, the operation mode is converted into the power saving mode PS again. In this way, the LCD operates in the power saving mode PS when there is no touch to reduce the power consumption. This embodiment may be particularly beneficial for portable devices employing LCDs, such as laptop computers, PDAs, cell phones, and other portable devices.

The present invention can be also employed in other flat panel displays such as an organic light emitting diode (OLED) display and a plasma display panel (PDP).

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An apparatus to drive a display panel including a photo sensing circuit and a pressure sensing circuit, the apparatus comprising:
    a first amplifier configured to be inputted a photo sensing signal from the photo sensing circuit;
    a second amplifier configured to be inputted a pressure sensing signal from the pressure sensing circuit;
    a first parallel-to-serial converter coupled with the first amplifier and selectively coupled with the second amplifier;
    a second parallel-to-serial converter selectively coupled with the second amplifier; and
    an analog-to-digital converter coupled with the first parallel-to-serial converter and the second parallel-to-serial converter,
    wherein the first and second amplifier, the first and second parallel-to-serial converter, and the analog-to-digital converter are configured to operate in one of a normal mode and a power saving mode based on the pressure sensing signal, and
    wherein the pressure sensing circuit senses a pressure by closing a switch under a pressure initiated by a touch exerted on a surface of the display panel, and
    when in the normal mode,
    the first amplifier amplifies the photo sensing signal,
    the second amplifier amplifies the pressure sensing signal,
    the first parallel-to-serial converter is coupled with the first amplifier and the second amplifier, and converts the amplified photo sensing signal and the amplified pressure sensing signal into first serial sensing signals, and
    the analog-to-digital converter converts the first serial sensing signals into first digital sensing signals, and
    when in the power saving mode,
    the first amplifier is not provided with power,
    the second amplifier amplifies the pressure sensing signal,
    the second parallel-to serial converter is coupled with the second amplifier, and converts the amplified pressure sensing signal into a second serial sensing signal, and
    the analog-to-digital converter converts the second serial sensing signal into a second digital sensing signal.

2. The apparatus of claim 1, further comprising:
    a first sample and holder connected between the first amplifier and the first parallel-to-serial converter, the first sample and holder configured to sample-and-hold the amplified photo sensing signal, wherein the apparatus is configured so power is not supplied to the first sample and holder in the power saving mode; and
    a second sample and holder connected between the second amplifier and the first parallel-to-serial converter in the normal mode, the second sample and holder connected between the second amplifier and the second parallel-to-serial converter in the power saving mode, and the second sample and holder configured to sample and hold the amplified pressure sensing signal.

3. The apparatus of claim 1, wherein the first parallel-to-serial converter is configured to operate in synchronization with a first clock signal, and
    the second parallel-to-serial converter is configured to operate in synchronization with a second clock signal having a frequency lower than the first clock signal.

4. The apparatus of claim 3, further comprising a switch configured to select one of the first parallel-to-serial converter and the second parallel-to-serial converter.

5. The apparatus of claim 1, wherein the system is configured so that power is not supplied to the first parallel-to-serial converter during the power saving mode, and so that power is not supplied to the second parallel-to-serial converter during the normal mode.

6. The apparatus of claim 1, wherein the analog-to-digital converter is configured to operate in synchronization with a first clock signal during the normal mode, and is configured to operate in synchronization with a second clock signal having a frequency lower than the first clock signal during the power saving mode.

7. The apparatus of claim 1, wherein the apparatus is configured to operate in the normal mode when it is determined from the pressure sensing signal that a touch exists, and the apparatus is configured to operate in the power saving mode when it is determined from the pressure sensing signal that there is no touch for a predetermined time.

8. The apparatus of claim 1, wherein the apparatus to drive the display device identifies a position of the touch, only if touching the display panel in substance.

9. The apparatus of claim 1, wherein the first parallel-to-serial converter is configured to convert the photo sensing signal and the pressure sensing signal into serial sensing signals in the normal mode and the second parallel-to-serial converter is configured to convert the pressure sensing signal into serial sensing signals in the power saving mode.

10. The apparatus of claim 9, wherein serial sensing signals through the first parallel-to-serial converter identify an existence of the touch and the position of the touch and serial sensing signals through the second parallel-to-serial converter identify only the existence of the touch in the normal mode.

11. An apparatus to drive a display device including a photo sensing circuit and a pressure sensing circuit, the apparatus comprising:
- a first amplifier configured to be inputted a photo sensing signal from the photo sensing circuit;
- a second amplifier configured to be inputted a pressure sensing signal from the pressure sensing circuit;
- a first parallel-to-serial converter coupled with the first amplifier and selectively coupled with the second amplifier;
- a second parallel-to-serial converter selectively coupled with the second amplifier; and
- an analog-to-digital converter coupled with the first parallel-to-serial converter and the second parallel-to-serial converter,
- wherein the apparatus is configured to operate in one of a normal mode and a power saving mode based on the pressure sensing signal, and
- when in the normal mode,
- the first amplifier amplifies the photo sensing signal,
- the second amplifier amplifies the pressure sensing signal,
- the first parallel-to-serial converter is coupled with the first amplifier and the second amplifier, and converts the amplified photo sensing signal and the amplified pressure sensing signal into first serial sensing signals, and
- the analog-to-digital converter converts the first serial sensing signals into first digital sensing signals, and
- when in the power saving mode,
- the first amplifier is not provided with power,
- the second amplifier amplifies the pressure sensing signal,
- the second parallel-to serial converter is coupled with the second amplifier, and converts the amplified pressure sensing signal into a second serial sensing signal, and
- the analog-to-digital converter converts the second serial sensing signal into a second digital sensing signal.

12. The apparatus of claim 11, further comprising:
- a first sample and holder connected between the first amplifier and the first parallel-to-serial converter and configured to sample-and-hold the amplified photo sensing signal, the apparatus configured to selectively block the first sample and holder from power supply based on the pressure sensing signal; and
- a second sample and holder connected between the second amplifier and the first parallel-to-serial converter in the normal mode, the second sample and holder connected between the second amplifier and the second parallel-to-serial converter in the power saving mode, and the second sample and holder configured to sample-and-hold the amplified pressure sensing signal.

13. The apparatus of claim 11, wherein the analog-to-digital converter is configured to operate in synchronization with a selected one of a first clock signal and a second clock signal having a frequency lower than the first clock, and the selection of one of the first and the second clock signals is based on the pressure sensing signal.

14. The apparatus of claim 11, wherein serial sensing signals through the first parallel-to-serial converter identify an existence of the touch and the position of the touch and serial sensing signals through the second parallel-to-serial converter identify only the existence of the touch in the normal mode.

15. An apparatus to drive a display panel including a photo sensing circuit and a pressure sensing circuit, the apparatus comprising:
- a first amplifier configured to be inputted a photo sensing signal from the photo sensing circuit;
- a second amplifier configured to be inputted a pressure sensing signal from the pressure sensing circuit;
- a first parallel-to-serial converter coupled with the first amplifier and selectively coupled with the second amplifier;
- a second parallel-to-serial converter selectively coupled with the second amplifier; and
- an analog-to-digital converter coupled with the first parallel-to-serial converter and the second parallel-to-serial converter,
- wherein, when in the normal mode,
- the first amplifier amplifies the photo sensing signal,
- the second amplifier amplifies the pressure sensing signal,
- the first parallel-to-serial converter is coupled with the first amplifier and the second amplifier, and converts the amplified photo sensing signal and the amplified pressure sensing signal into first serial sensing signals, and
- the analog-to-digital converter converts the first serial sensing signals into first digital sensing signals, and
- when in the power saving mode,
- the first amplifier is not provided with power,
- the second amplifier amplifies the pressure sensing signal,
- the second parallel-to serial converter is coupled with the second amplifier, and converts the amplified pressure sensing signal into a second serial sensing signal, and
- the analog-to-digital converter converts the second serial sensing signal into a second digital sensing signal, and
- wherein the analog-to-digital converter is configured to operate in synchronization with a selected one of a first clock signal and a second clock signal having a frequency lower than the first clock signal, and the selection of one of the first and the second clock signals is based on the pressure sensing signal,
- wherein the pressure sensing circuit senses a pressure by closing a switch under a pressure initiated by a touch exerted on a surface of the display panel.

16. The apparatus of claim 15, wherein the first parallel-to-serial converter is configured to operate in synchronization with the first clock signal and
- the second parallel-to-serial converter is configured to operate in synchronization with the second clock signal.

17. The apparatus of claim 15, further comprising a switch configured to select one of the first parallel-to-serial converter and the second parallel-to-serial converter based on the pressure sensing signal.

18. A display device comprising a display panel assembly which comprises:
- a display panel which comprises a plurality of pixels which include:
- a plurality of photo sensing circuits,
- a plurality of pressure sensing circuits, and
- a plurality of sensor data lines connected to the photo sensing circuits and the pressure sensing circuits;
- an image data driver configured to convert image signals into data voltages and configured to apply the data voltages to the display panel assembly;
- a sensing signal processor configured to process photo sensor data signals supplied from the photo sensing circuits and pressure sensor data signals supplied from the pressure sensing circuits, and configured to operate in one of a normal mode and a power saving mode based on the pressure sensor data signals; and
- a signal controller configured to receive the image signals from an external device and to control the image data driver and the sensing signal processor, wherein the pressure sensing circuit senses a pressure by closing a switch under a pressure initiated by a touch exerted on a surface of the display panel assembly, and wherein the sensing signal processor receives the photo sensing signal and the pressure sensing signal in the normal mode and receives the pressure sensing signal in the power saving mode, wherein the sensing signal processor comprises:

a first amplifier configured to be inputted a photo sensing signal from the photo sensing circuit;

a second amplifier configured to be inputted a pressure sensing signal from the pressure sensing circuit;

a first parallel-to-serial converter coupled with the first amplifier and selectively coupled with the second amplifier;

a second parallel-to-serial converter selectively coupled with the second amplifier; and an analog-to-digital converter coupled with the first parallel-to-serial converter and the second parallel-to-serial converter, when in the normal mode, the first amplifier amplifies the photo sensing signal, the second amplifier amplifies the pressure sensing signal, the first parallel-to-serial converter is coupled with the first amplifier and the second amplifier, and converts the amplified photo sensing signal and the amplified pressure sensing signal into first serial sensing signals, and the analog-to-digital converter converts the first serial sensing signals into first digital sensing signals, and when in the power saving mode, the first amplifier is not provided with power, the second amplifier amplifies the pressure sensing signal, the second parallel-to serial converter is coupled with the second amplifier, and converts the amplified pressure sensing signal into a second serial sensing signal, and the analog-to-digital converter converts the second serial sensing signal into a second digital sensing signal.

19. The display device of claim 18, wherein the device is configured so the first amplifier is not supplied power during the power saving mode.

20. The display device of claim 18, wherein the first parallel-to-serial converter is configured to operate during the normal mode, and the second parallel-to-serial converter is configured to operate during the power saving mode.

21. The display device of claim 20, wherein the first parallel-to-serial converter is configured to operate in synchronization with a first clock signal, and the second parallel-to-serial converter is configured to operate in synchronization with a second clock signal having a frequency lower than the first clock signal.

22. The display device of claim 20, wherein the device is configured so that the first parallel-to-serial converter is not supplied power during the power saving mode, and the second parallel-to-serial converter is not supplied power during the normal mode.

23. The apparatus of claim 20, wherein the first parallel-to-serial converter is configured to convert the photo sensing signal and the pressure sensing signal into serial sensing signals in the normal mode and the second parallel-to-serial converter is configured to convert the pressure sensing signal into serial sensing signals in the power saving mode.

24. The apparatus of claim 23, wherein serial sensing signals through the first parallel-to-serial converter identify an existence of the touch and the position of the touch and serial sensing signals through the second parallel-to-serial converter identify only the existence of the touch in the normal mode.

25. The display device of claim 18, wherein the analog-to-digital converter is configured to operate in synchronization with a first clock signal during the normal mode, and is configured to operate in synchronization with a second clock signal having a frequency lower than the first clock signal during the power saving mode.

26. The display device of claim 18, wherein the image data driver, the sensing signal processor, and the signal controller are integrated in a single integrated circuit chip.

27. The apparatus of claim 18, wherein the apparatus to drive the display panel identifies a position of the touch, only if touching the display panel in substance.

28. A method of driving a display panel including a photo sensing circuit and a pressure sensing circuit, the method comprising:

processing a first pressure sensing signal output from the pressure sensing circuit;

determining whether a touch exists based on the first pressure sensing signal;

if it is determined from the first pressure signal that there is a touch, processing a photo sensing signal outputted from the photo sensing circuit and a second pressure sensing signal outputted from the pressure sensing circuit together in a normal mode;

determining whether a touch exists based on the second pressure sensing signal; and when it is determined from the second pressure signal that there is no touch for a predetermined time, processing the first pressure sensing signal output from the pressure sensing circuit in a power saving mode, wherein the pressure sensing circuit senses a pressure by closing a switch under a pressure initiated by a touch exerted on a surface of the display panel, and wherein the display panel further comprises:

a first amplifier configured to be inputted a photo sensing signal from the photo sensing circuit;

a second amplifier configured to be inputted a pressure sensing signal from the pressure sensing circuit;

a first parallel-to-serial converter coupled with the first amplifier and selectively coupled with the second amplifier;

a second parallel-to-serial converter selectively coupled with the second amplifier; and an analog-to-digital converter coupled with the first parallel-to-serial converter and the second parallel-to-serial converter, when in the normal mode, the first amplifier amplifies the photo sensing signal, the second amplifier amplifies the pressure sensing signal, the first parallel-to-serial converter is coupled with the first amplifier and the second amplifier, and converts the amplified photo sensing signal and the amplified pressure sensing signal into first serial sensing signals, and the analog-to-digital converter converts the first serial sensing signals into first digital sensing signals, and when in the power saving mode, the first amplifier is not provided with power, the second amplifier amplifies the pressure sensing signal, the second parallel-to serial converter is coupled with the second amplifier, and converts the amplified pressure sensing signal into a second serial sensing signal, and the analog-to-digital converter converts the second serial sensing signal into a second digital sensing signal.

29. The method of claim 28, wherein when it is determined from the first pressure signal that there is no touch, the processing of the first pressure sensing signal is continued, and when it is determined from the second pressure signal that there is a touch and an elapsed time is shorter than the predetermined time, the processing of the photo sensing signal and a second pressure sensing signal is continued.

30. The method of claim 29,
wherein the processing of the first pressure sensing signal comprises:
blocking power from being applied to the amplifier.

31. The method of claim 29, wherein the processing of the first pressure sensing signal comprises:
driving the parallel-to-serial converter and the analog-to-digital converter to operate in synchronization with a first clock signal; and
wherein the processing of the photo sensing signal and a second pressure sensing signal comprises:
driving the parallel-to-serial converter and the analog-to-digital converter to operate in synchronization with a second clock signal having a frequency higher than the first clock signal.

32. The method of claim 29, wherein the processing of the first pressure sensing signal comprises:
blocking power from being applied to the first parallel-to-serial converter; and
wherein the processing of a photo sensing signal and a second pressure sensing signal comprises:
blocking power from being applied to the second parallel-to-serial converter.

33. The method of claim 32, wherein the first parallel-to-serial converter is configured to convert the photo sensing signal and the pressure sensing signal into serial sensing signals in the normal mode and the second parallel-to-serial converter is configured to convert the pressure sensing signal into serial sensing signals in the power saving mode.

34. The method of claim 33, wherein serial sensing signals through the first parallel-to-serial converter identify an existence of the touch and the position of the touch and serial sensing signals through the second parallel-to-serial converter identify only the existence of the touch in the normal mode.

35. The method of claim 28, wherein the apparatus to drive the display panel identifies a position of the touch, only if touching the display panel in substance.

36. A display apparatus comprising:
touch detection circuitry comprising:
a light sensing circuit configured to generate a signal indicative of sensed light; and
a physical parameter sensing circuit configured to generate a signal indicative of a sensed physical parameter;
processing circuitry configured to generate touch information indicative of at least one of detection information and position information of a touch, wherein the processing circuitry implements a power-saving mode and a normal mode; and
wherein the processing circuitry is configured to generate the touch information based on the signal indicative of the sensed physical parameter and not based on the signal indicative of sensed light in the power saving mode,
and wherein the physical parameter sensing circuit senses a pressure by closing a switch under a pressure initiated by a touch exerted on a surface of a display panel of the display apparatus, and
wherein the processing circuitry further comprises:
a first amplifier configured to be inputted the signal indicative of sensed light;
a second amplifier configured to be inputted the signal indicative of the sensed physical parameter;
a first parallel-to-serial converter coupled with the first amplifier and selectively coupled with the second amplifier;
a second parallel-to-serial converter selectively coupled with the second amplifier; and
an analog-to-digital converter coupled with the first parallel-to-serial converter and the second parallel-to-serial converter,
when in the normal mode,
the first amplifier amplifies the signal indicative of sensed light,
the second amplifier amplifies the signal indicative of the sensed physical parameter,
the first parallel-to-serial converter is coupled with the first amplifier and the second amplifier, and converts the amplified signal indicative of sensed light and the amplified signal indicative of the sensed physical parameter into first serial sensing signals, and
the analog-to-digital converter converts the first serial sensing signals into first digital sensing signals, and
when in the power saving mode,
the first amplifier is not provided with power,
the second amplifier amplifies the signal indicative of the sensed physical parameter,
the second parallel-to serial converter is coupled with the second amplifier, and converts the amplified signal indicative of the sensed physical parameter into a second sensing signal, and
the analog-to-digital converter converts the second serial sensing signal into a second digital sensing signal.

37. The apparatus of claim 36, wherein the processing circuitry is configured to generate the touch information based on the signal indicative of the sensed physical parameter and based on the signal indicative of sensed light in the normal mode.

38. The apparatus of claim 36, wherein the physical parameter sensing circuit is a pressure sensing circuit.

39. The apparatus of claim 36, wherein the apparatus to drive the display panel identifies a position of the touch, only if touching the display panel in substance.

* * * * *